United States Patent [19]  
Inoyama

[11] 3,965,562  
[45] June 29, 1976

[54] METHOD AND APPARATUS FOR POSITIONING CONTROL
[75] Inventor: Tadao Inoyama, Yokohama, both of Japan
[73] Assignee: Hitachi, Ltd., Japan
[22] Filed: Jan. 20, 1975
[21] Appl. No.: 542,303

[30] Foreign Application Priority Data
Jan. 18, 1974  Japan.................................. 49-7922
Feb. 1, 1974   Japan.................................. 49-12747

[52] U.S. Cl. .................................. 29/407; 29/200 P
[51] Int. Cl.² ....................................... B23Q 17/00
[58] Field of Search ............... 29/407, 200 P, 203 P, 29/208 R

[56] References Cited  
UNITED STATES PATENTS
| | | | |
|---|---|---|---|
| 3,052,974 | 9/1962 | Williams | 29/407 |
| 3,326,176 | 6/1967 | Sibley | 29/407 X |
| 3,581,375 | 6/1971 | Rottmann | 29/407 |
| 3,824,674 | 7/1974 | Inoyama | 29/407 |

Primary Examiner—Victor A. DiPalma  
Attorney, Agent, or Firm—Craig & Antonelli

[57] ABSTRACT

In order to accurately position a plurality of work pieces in registration with a plurality of corresponding target positions on another work piece, the distance between a first detector, which detects one of the positions of a plurality of positioning targets on a single first workpiece, and another detector for detecting the position of another positioning target on the work piece is made equal to the distance between the positioning targets. One of a second plurality of other work pieces is positioned in registration with one of the positioning targets and a detecting mechanism provided with the detectors is rotated about a prescribed reference position. Then another positioning target on the first work piece is detected by means of the detecting mechanism, so that the positions of the plurality of second work pieces will be brought into registration with the plurality of positioning targets on the first work piece.

16 Claims, 8 Drawing Figures

METHOD AND APPARATUS FOR POSITIONING CONTROL

BACKGROUND OF THE INVENTION

1. Field of the Invention:

The present invention relates to a control system for positioning a plurality of work pieces in registration with a plurality of corresponding target positions on another work piece within a confined range and, more particularly, to a technique for positioning the respective axes of multi-spindle tools, such as the multi-spindle screw drivers of a screw driving machine, into registration with a plurality of holes in a work piece, such as a flange.

2. Description of the Prior Art:

Because of the difficulties in automating the assembly operation of a production line, the assembly operation has been carried out manually. One of the techniques employed for assembling a plurality of parts together into one united functional component is the screw driving technique, wherein, manually, a screw is inserted into a hole and then the screw is tightened mechanically, through the use of a tool such as a screw driver. While proposals have been made for automating the screw tightening operation by the use of an automatic screw tightening machine in combination with a mechanism for bringing a hole in a work piece into registration with a screw position therefor, difficulties in the practical application of this technique have arisen in that there has not been a saving in man power and strict accuracy in the positioning mechanism is necessary.

In general, in a workpiece, there are the plurality of screw holes which are to come into registration with holes in another work piece such as a flange, for receiving screws and it is common practice to prepare the screw holes with high accuracy in terms of the relative positions. Yet, there remains the problem of positioning a work piece such as a flange in a screw tightening machine, because of the relative positional variation of the flange even if the hole positions for the screws to be inserted therein are provided accurately.

Accordingly, the complete registration of screw positions in a multi-spindle screw tightening machine with the corresponding positions of a plurality of such holes has resulted in a considerable amount of difficulty.

SUMMARY OF THE INVENTION

It is, accordingly, a principle object of the present invention to provide an apparatus and a technique for controlling the positioning operation of multi-spindles, through the use of a relatively simple automatic assembling device and method.

In accordance with the present invention, a first hole in a work piece is initially detected and then a second hole which is in a specific positional relationship with respect to the first hole is detected, so as to achieve an initial positioning of the two work pieces relative to each other. More particularly, a first detector for detecting a first hole which may be positioned in one of a plurality of varying positions is provided integrally with a second detector which is positioned in accordance with a specific relationship relative to the first detector. Thus, the first hole is first detected by means of the first detector and then the entire combination of the first and second detectors is rotated about the position of the first hole thus detected so that the second detector will move along a locus including the second hole. As a result, after the combination is rotated, while detecting the second hole, the first and second holes of the plurality of holes will be in registration with the first and second detectors respectively. By selecting these two holes suitably, the positioning of the entire work piece structure may be carried out to the positions and rotational directions.

DETAILED DESCRIPTION

Figure 1:
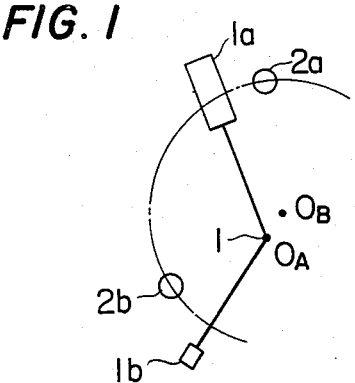
FIG. 1 illustrates graphically the technique for positioning control in accordance with the present invention.

At the dot 1 in FIG. 1 is disposed a detecting mechanism having a center of rotation OA which may be shifted to any arbitrary position in a plane, whith the mechanism 1 being rotated about the center OA. The initial position of the detecting mechanism should be between the hole 2a and 2b and the mechanism 1 is rotated about the center OA or is shifted to the right, as viewed in the drawing, until the hole 2a in a first workpiece is brought into registration with a portion of the detector 1a. Upon this registration detector 1a will provide an output confirming the position of the hole 2a. In this arrangement, of course, the detecting surface should be longer than the range of variation in the positions of the holes.

Next, the reference position on the detecting surface of the detector 1a is brought into registration with the position of the hole 2a. (alternatively, this positioning step may be carried out in accordance with the method described in U.S. Pat. No. 3,824,674).

Now, the entire structure of the detecting mechanism 1 is rotated about the position of the hole 2a, maintaining the reference position of the detector 1a in registration with the position of the hole 2a. As long as the distance between detectors 1a and 1b is equal to the distance between the centers of the holes 2a and 2b, the detector 1b will be in registration with the position of the hole 2b in accordance with this rotation. As a result, by stopping the structure in this position, the positions of the two holes may be brought into registration with the detectors, so that if a positioning mechanism is controlled so as to be in registration with the positions of the detecting mechanism, then the positions of the hole may be brought into registration with the positions of the positioning mechanism.

Figure 2:
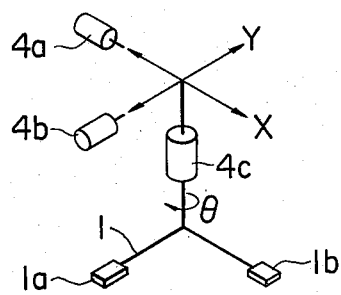
FIG. 2 illustrates a positioning mechanism employed in accordance with the present invention.

In FIG. 2 there is shown the construction of the detecting mechanism of FIG. 1. Positioning mechanisms 4a and 4b may move a positioning mechanism 4c two dimensionally along X and Y coordinate directions. The positioning mechanism 4c may be rotated about an axis Z which is perpendicular to the axes X and Y in a conventional three-coordinate system. The positioning mechanism 4a, 4b and 4c, per se, are well known and the details thereof are unnecessary for an understanding of the present invention.

The positioning of the detecting mechanism 1, consisting of detectors 1a and 1b, in the X–Y plane may be carried out by means of positioning mechanisms 4a and 4b, with mechanism 1 being rotated by means of positioning mechanism 4c.

The positioning mechanisms 4a, 4b and 4c control the positioning of the detecting mechanism 1 and also serve as positioning mechanism for tools such as those employed in a screw tightening machine operated after the detection of the positions.

Figure 3:
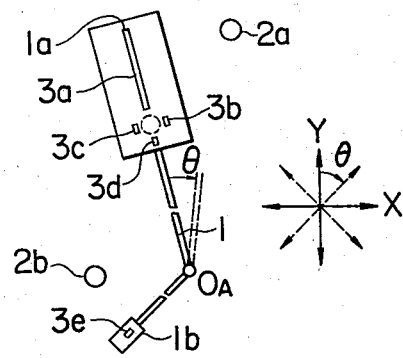
FIG. 3 and FIG. 4 illustrate detecting mechanisms employed in accordance with the present invention.

The detectors are arranged as shown in FIG. 3, with detecting portions 3a, 3b, 3c and 3d, such as light reflection detecting elements, disposed upon detector 1a, with the detecting elements surrounding a non-sensitive area which is larger than the outer periphery of the hole 2a.

Also provided on the detector 1b is a detecting portion 3e such as a light-reflecting detecting element, and this portion detects the registration with the hole 2b. The distance between the center of the non-sensitive portion of the detector 1a and the center of the detecting portion 3e is adjusted to be equal to the distance between the positions of the holes 2a and 2b. With reference now to FIG. 2, the operation of the above elements in carrying out the initial positioning and detecting step will be explained. The positioning mechanism 4a in FIG. 2 attends upon the X-direction shown in FIG. 3, the mechanism 4b attends upon the Y direction shown in FIG. 3 and the mechanism 4c attends upon the θ-direction shown in FIG. 3.

The initial position of the detecting mechanism is that intermediate the hole 2a and the hole 2b, as previously described. Then, the detecting mechanism 1 is rotated about the center OA in the θ direction. When a signal is provided from one of the detecting portions 3a, 3b and 3c and 3d of the detector 1a, the rotation of the mechanism 1 is stopped. If a detecting signal is not obtained the detecting mechanism 1 continues to rotate. The positioning mechanisms 4a, 4b are driven in accordance with the detecting outputs from the portions 3a, 3b, 3c, 3d in such a manner that for instance, the hole 2a will be positioned within an area surrounded by the detecting portions 3a, 3b, 3c, 3d. For such positioning, as in the case where the output of the detecting portion 3a is "1" and the output of detecting portion 3d is "0", the detecting mechanism 1 is shifted in the -Y-direction. Conversely, where the output of the detecting portion 3d is "1" and the output of the detecting portion 3a is "0", the detecting mechanism "1" is shifted in the +Y direction. Similarly, mechanism 1 will be positioned with respect to the X direction in response to the outputs of detecting portions 3c and 3b, so that when the outputs of the portions 3a–3d all equal "0", positioning control ceases, so that the positions of the holes will appear in the area surrounded by the detecting portions 3a–3d. As a result of the above-referred to operation, the position of the hole 2a is established.

Figure 4:
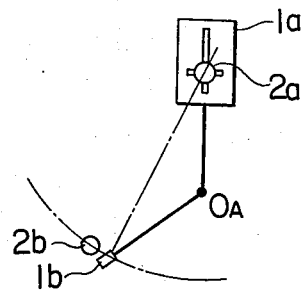

Next, the position of the hole 2b is detected. In this case, if the controlling operation is continued so as to position the hole 2a in a portion surrounded by detecting portions 3a–3d, and the mechanism 1 is rotated in the θ direction, then the detecting mechanism 1 will seemingly rotate about the hole 2a. As a result, as is illustrated in FIG. 4, the center of the hole 2b will be positioned on the circumference of detector 1b which rotates about the center of the portion surrounded by the detecting portions of the detector 1a, so that if the mechanism 1 continues to rotate, there should be encountered a position which will provide a registration relationship and thus the control should cease at that position. In this manner, the positions of detectors 1a and 1b are brought into registration with the pair of holes 2a and 2b, so that the positioning of the multi-spindles may be effected by bringing the positions of the positioning mechanism for tools employed in the subsequent operation into registration with the positions of the detectors 1a and 1b.

In the above referred to operation, the rotational center OA of the detecting mechanism 1 need not always be positioned intermediate detectors 1a and 1b. This method is applicable to a case where the rotational center is positioned to one side of the detecting center of a detector.

Figure 5:
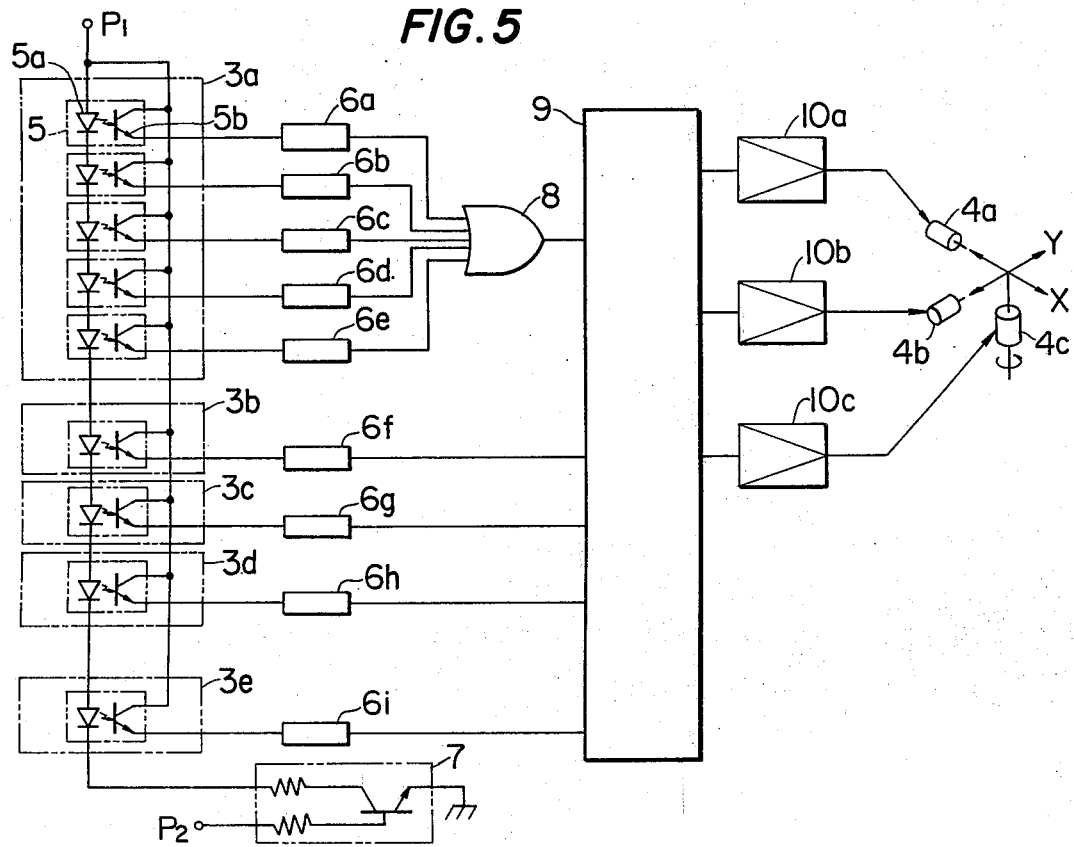
FIG. 5 is a schematic illustration of a control circuit employed in accordance with the present invention.

FIG. 5 illustrates an embodiment of a control circuit employed in accordance with the present invention. The detecting portions 3a–3d of detector 1a and the detecting portion 3e of detector 1b are provided with detecting elements 5 consisting of luminous diodes 5a and photo-transistors 5b. Photo-transistor 5b is positioned so as to receive the light emitted from the luminous diode 5a and provides an electric current output corresponding to the intensity of the reflecting light which varies in dependence upon the distance between the detecting element and the object to be detected. Moreover, luminance diode 5a is illuminated due to the application of an intermittent voltage resulting from a switch 7 which is adapted to be turned on or off in response to the output at terminal P2 with a voltage being applied to terminal P1.

The outputs of the photo-transistors 5b are converted into digital signals by means of the respective wave-forming circuits 6a–6i and are supplied to detecting signal processing circuit 9 made up of combinational logic which determines the control sequence of the above discussed positioning system. The outputs are then converted into drive input signals to be fed to drive portions 10a–10c of mechanisms 4a–4c, respectively. However, the detecting portion 3a requires the aforesaid detecting length, so that a plurality of detecting elements 5 are provided in a linear arrangement, the outputs therefrom being supplied to an OR circuit for obtaining an "OR" output, from which an output signal is supplied to the processing circuit 9.

Detecting element 5, as employed in the detecting portion, has been described as an optical type element consisting of a luminous diode 5a and a photo-transistor 5b. The element 5 is not limited to this configuration, but may be made up of a probe and an access switch, using a Hall element, as long as it identifies the presence of an object to be detected. Moreover, although the above-discussed operation and embodiment relates to the positions of holes to be detected, other identifications, such as projections or marks may be likewise detected.

Figure 6:
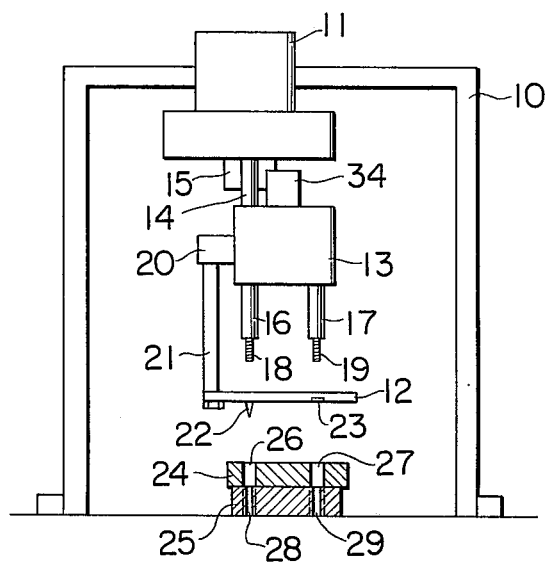
FIG. 6 is a side elevational view of an ambodiment of an automatic multi-spindle tightening machine in which the present invention may be employed.

FIG. 6 is a side elevational view of another embodiment of the invention, wherein the invention is applied to a multi-screw tightening machine. In this figure, a support 10, having a gate shape, is provided with a positioning mechanism 11, of a multi-spindle screw tightening machine, supported thereby, which positioning mechanism drives a detecting mechanism 12 and a multi-spindle screw tightening mechanism 13. These elements will be referred to as a multi-spindle tool mechanism hereinafter. This mechanism is driven in the X (transverse), Y longitudinal), and Z (vertical) directions.

The multi-spindle tool mechanism 13 and and detecting mechanism 12 are coupled through the medium of a rotary shaft 14 to positioning mechanism 11, while the rotary shaft 14 itself is rotated in the θ direction, shown in FIG. 4, by means of a rotary mechanism 15. Screw drivers 16 and 17 are provided for use in the multi-spindle tool mechanism 13. At the tip portions of these mechanisms respective screws 18 and 19 are shown. The center axis of screw driver 16 is aligned with the center axis of the rotary shaft 14 also. As will be explained hereinafter, detecting mechanism 12 is rotated by means of a drive shaft 21, of the rotational drive mechanism 20, after positioning, so that the detecting mechanism 12 will not hinder the operation of the multi-spindle tool mechanism 13.

First and second detectors 22 and 23, which detect the positions of the first and second holes are provided for the detecting mechanism 12 and the first detector 22 is located on the center axis of the rotary shaft 14 and screw driver 16. Work pieces 24 and 25, i.e. parts to be screw-tightened or fastened by means of screws, are provided with holes 26 or 27, located in registration with screw holes 28 and 29, respectively.

Figure 7:
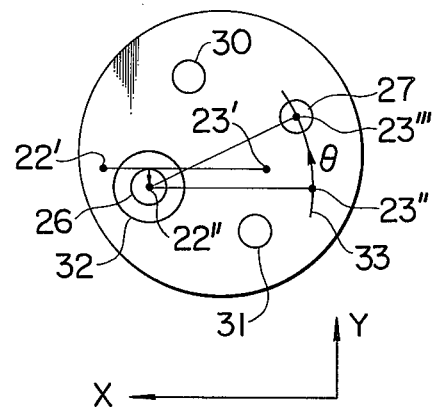
FIG. 7 illustrates a hole-position detecting technique incorporated in the automatic multi-spindle screw tightening machine of FIG. 6.

A top view of work piece 24 is illustrated in FIG. 7, the work piece 24 having holes 30 and 31 in addition to the holes 26 and 27, shown in FIG. 6. The multi-spindle positioning referred to herein corresponds to the bringing of the four holes into registration with the positions of the screw drivers corresponding thereto.

Figure 8:
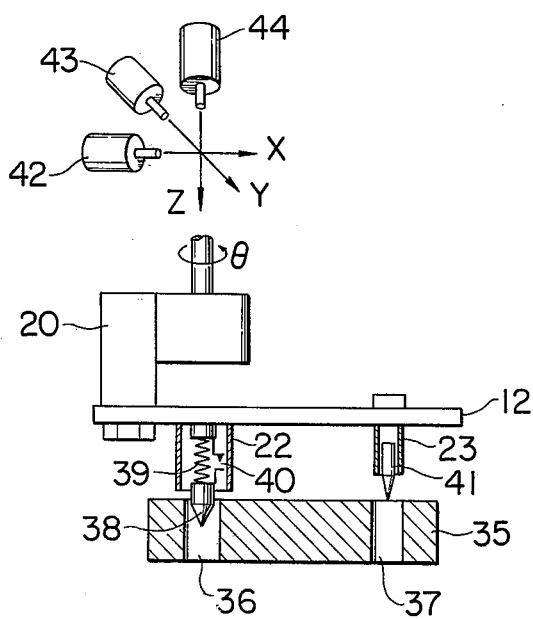
FIG. 8 illustrates an embodiment of a hole-positioning detecting mechanism.

Now, assume that the first hole 26 lies within the positioning range shown by a circle 32, due to the variations of the positions of the parts or work pieces employed. The first detector 22 is initially positioned at location 22', out of the range of the variation defined by circle 32 and is brought into contact with work piece 24. The detector is then shifted by means of a positioning mechanism 11 in the X direction for detection purposes. An example of the detector 22 in accordance with this embodiment may be a contact-type detector consisting of a tapered pin, as illustrated in FIG. 6, supported by means of a spring. An enlarged view of this tapered pin-spring mechanism is shown in FIG. 8, wherein tapered pin 38 is supported by spring 39.

The particular arrangement of FIG. 8 will be discussed hereinafter.

Still considering the arrangement shown in FIG. 7, the position of the hole is detected by detecting whether or not the tapered pin has been urged into the hole by means of the spring. In this case, since the tapered pin is supported by the spring, the position of the hole may be detected even if there is a slight variation in the position of the hole in the Y axis direction.

Assuming that the first detector 22 and the second detector 23, for the detecting mechanism 12, are located in the positions 22' and 23', and as a result of detection, the first hole 26 is detected at positions 22'' and 23'', then the first hole 26, first detector 22 and screw driver 16 will be located along the same axis.

The distance between the first and second detectors 22 and 23 is so arranged to be equal to that between the first and second holes 26 and 27. Then, if the rotary shaft 14 is located in the θ direction, the position of the second detector 23 will describe an arc 33 about the position 22'' of the first detector 22. It necessarily follows that when the second detector 23 reaches the position 23''', shaft 14 will cease rotating, so that the positions of the first and second detectors will be established at locations 22'' and 23''', thus completing the detection of the positions of the holes provided in the work piece so that the positions of the holes will be in accurate registration with the positions of the respective screw drivers.

Subsequently, the rotational drive for rotation 20, shown in FIG. 6, is driven and the detecting mechanism 12 is rotated through an angle 180° so as to preclude interference therebetween. Then, screw drivers 16 and 17 are lowered in the Z direction by means of a vertical feeding mechanism 34, since the positions of the dcrew drivers have been aligned with the respective holes. As a result, the screws may be inserted into the respective holes accurately.

FIG. 8 illustrates an embodiment of the above-referred to detector, wherein a portion 35 of the work piece has holes 36 and 37 therethrough. Detector 22 of the above-referred to contacting type including a tapered pin 38 and a supporting spring 39, is provided so that the spring 39 is extended or compressed due to the vertical movements of the tapered pin 38 and, accordingly, the extension and compression of the spring 39 are detected by means of an extension and compression detector 40, which as shown in FIG. 8, is simply a micro-switch, the opening and closing of the contacts of which depend upon the compression or extension of the spring 39.

The detector 23, on the other hand, is of the non-contacting type which contains a detecting portion 41 consisting of a combination of a luminous diode and a photo-diode to thereby detect the positions of the holes by employing the light reflected from the surface of the work piece.

Drive motors 42, 43, and 44 are employed for the positioning mechanism 11. When motor 44 is driven so as to lower the detecting mechanism 12 to bring the tip of the tapered pin 38 into contact with the surface of the work piece 35, then the contacts 40 of the micro switch are closed. If motor 42 is then driven and the tapered pin 38 is displaced while being urged against the surface of the work piece 35, due to the force provided by spring 39, then as the tapered pin 38 is displaced along the surface of the work piece 35, it will drop into the hole 36. As a result of the tapered tip 38 dropping into the hole 36, contacts 40 of the micro-switch open, thereby providing an indication that the tapered pin 38 is in registration with the open hole 36.

In this manner, an approximation of the positions of the holes may be detected. However, if further accurate positioning is required, than an accurate fitting control technique, as disclosed in U.S. Pat. No. 3,824,674, referred to previously, may be employed. There may also be employed a device which may continuously detect variations in the extension or compression of the spring 39, such as a potentiometer, differential transformer, strain gauge, etc. so that the position of the spring, when extended to its maximum will be detected in response to the displacement provided by the activation of motors 42 and 43 in the X and Y directions.

In the above embodiment, description has been given wherein detector 22 is of the contacting type. However, the detector may be a non-contacting type, such as a photo-electric, pneumatic, or magnetic type of detector.

In addition, according to this embodiment, while the detecting mechanism 12 is provided integrally with the multi-spindle tool mechanism 13 provided with screw drivers 16 and 17, so that a corrective operation is carried out simultaneously by means of the positioning mechanism commensurate with a detecting signal, alternatively, the positioning mechanism 11 may be divided into respective drive mechanisms for driving a detecting mechanism as well as for a multiple-spindle tool mechanism, so that the desired position will be detected by displacing the detecting mechanism due to its drive mechanism. Then, the resulting extent of displacement is converted into an electrical signal by means of a transformer, a potentiometer or the like, for providing a signal to the drive mechanism of the multiple-spindle tool mechanism.

Moreover, while a pair of detectors 22 and 23 are provided in the above embodiment, three detectors may be employed depending upon the arrangement of the holes, so that in the course of the detection of the second hole, second and third holes may be detected in order to align the holes of a work piece into accurate registration with the positions of the multiple-spindle tools. This may serve as a means for confirming the registration between the positions of the holes and the tools, where there are irregularities, such as projections in the vicinities of holes, which would be a source for noise in the system.

Also, a reference point such as a hole for positioning may be provided in a workpiece to be worked on beforehand, so that the reference point may be detected by means of a detector, so that a tool may be employed at a given position. In this case, the position of the reference point is different from the position of the tool, and the detectors 22 and 23 should not necessarily be displaced for working as has been described with reference to FIG. 3. A desired amount of working may be accomplished, with the detector remaining at the reference point.

Also, while description has been given in the case where the detecting mechanism and multiple spindle tool mechanism are displaced for positioning, with the work piece remaining stationary, alternatively the detecting mechanism and tools may be stationary while the work piece is moved for establishing registration.

While we have shown and described an embodiment in accordance with the present invention, it is understood that the same is not limited thereto but is susceptible of numerous changes and modifications as known to a person skilled in the art and we therefore do not wish to be limited to the details shown and described herein but intend to cover all such changes and modifications as are obvious to one of ordinary skill in the art.

We claim:

1. A method of positioning a first work piece in a prescribed alignment with a second work piece, said second work piece containing a plurality of positioning identification characteristic points, comprising the steps of:
   a. aligning a first detector defined relative to a first predetermined location on said first work piece with one of said positioning identification characteristic points on said second work piece; and
   b. rotating said first work piece relative to said second work piece about an axis passing through said first predetermined location on said first work piece and said one of said positioning identification characteristic points on said second work piece until another of said positioning identification characteristic points on said second work piece is aligned with a second detector defined relative to a second predetermined location on said first work piece.

2. A method of positioning a first work piece in a prescribed alignment with a second work piece, said second work piece containing a plurality of positioning identification characteristic points, comprising the steps of:
   a. aligning a first detecting position defined relative to a first predetermined location on said first work piece with one of said positioning identification characteristic points on said second work piece; and
   b. rotating said first work piece relative to said second work piece about an axis passing through said first predetermined location on said first work piece and said one of said positioning identification characteristic points on said second work piece until another of said positioning identification characteristic points on said second work piece is aligned with a second detecting position defined relative to a second predetermined location on said first work piece,
   wherein step (a) includes the steps of
      a1. coupling a first detector to said first work piece so that said first detector is aligned with said first predetermined location on said first work piece, and
      a2. displacing said first work piece over the surface of said second work piece an amount necessary to align said first detector with said one of said positioning identification characteristic points on said second work piece.

3. A method according to claim 2, wherein step (b) includes the steps of
   b1. coupling a second detector to said first work piece so that the distance between said first and second detectors is equal to the distance between said one and said another of said positioning characteristic points on said second work piece and
   b2. rotating said first and second work pieces relative to each other about said axis until said second detector is aligned with said another of said positioning identification characteristic points on said second work piece.

4. A method according to claim 3, wherein step (a2) comprises the steps of
   a2-1. bringing said first detector into contact with the surface of said second work piece, and
   a2-2. displacing said first and second work pieces relative to each other so that said first detector is displaced across the surface of said work piece until said first detector provides an output indicating that said first detector is disposed over said one of said positioning identification characteristic points on said second work piece,
   and wherein step (b2) includes the step of
   b2-1. rotating said first and second work pieces relative to each other about said axis until said second detector provides an output indicating that said second detector is disposed over said another of said positioning identification characteristic points on said second work piece.

5. A method according to claim 3, further including the steps of:
   c. rotating said first and second detectors out of alignment with said positioning identification characteristic points on said second work piece, and
   d. bringing said first work piece into contact with said second work piece, said first and second predetermined locations on said first work piece being aligned with said one and said another positioning identification characteristic points on said second work piece, respectively.

6. An apparatus for positioning control to position multi-spindle tools in registration with at least first and second detecting points on a work piece comprising:
   a detecting mechanism provided with first and second detectors corresponding to said first and second detecting points;
   a first drive mechanism for varying the relative position between said first detector and said first detecting point; and
   a second drive mechanism for rotating said detecting mechanism relative to said object about said first detecting position serving as a rotational center to thereby bring said second detector into registration with said detecting point after said first drive mechanism has brought said first detector into registration with said first detecting point.

7. An apparatus for positioning control, according to claim 6, wherein each of said detectors includes detecting elements consisting of luminous elements and light detecting elements for detecting the light emitted from said luminous elements and reflected by said work piece.

8. An apparatus for positioning control according to claim 7, wherein said first detector has a plurality of detecting elements arranged so as to surround a non-sensitive area having a size approximating that of a hole in said work piece corresponding to a detecting point thereon, said plurality of detecting elements being electrically insulated from each other.

9. An apparatus for positioning control according to claim 6, wherein said first detector has a plurality of detecting elements which are inscribed inwardly of an area of a size approximating that of a hole in said work piece corresponding to a detecting point thereon, which detecting elements are located in directions corresponding to orthogonal X and Y drive axes.

10. An apparatus for positioning control according to claim 6, wherein said first detector has a plurality of detecting elements which are circumscribed outwardly of an area of a size approximating that of a hole in said work piece corresponding to a detecting point thereon, which detecting elements are located in directions corresponding to orthogonal X and Y drive axes.

11. An apparatus for positioning control for multi-spindle tools, comprising:
   a detecting mechanism provided with a first detector and a second detector the distance therebetween being equal to the distance between a plurality of holes in a work piece;
   a positioning mechanism for driving said detecting mechanism in respective X, Y, Z and rotational directions relative to said work piece;
   a multi-spindle tool mechanism, holding thereon a plurality of screws which are to be inserted in holes in said work piece and having a plurality of axes spaced apart from each other according to spacings between said holes, said tools being driven in the X, Y, Z directions and in said rotational direction, coupled with said detecting mechanism, to which said tools are coupled; and
   a mechanism for holding said detecting mechanism midway between said multi-spindle tool and a work piece, and for rotating said detecting mechanism in a plane perpendicular to the axes of said tools but about an axis different from those of said tools.

12. A method for controlling an apparatus for positioning control for multi-spindle tools, which apparatus includes:
   a detecting mechanism provided with a first detector and a second detector the distance therebetween being equal to the distance between a plurality of holes in a work piece;
   a positioning mechanism for driving said detecting mechanism in respective X, Y, Z and rotational directions relative to said work piece;
   a multi-spindle tool mechanism, holding thereon a plurality of screws which are to be inserted in holes in said work piece and having a plurality of axes spaced apart from each other according to spacings between said holes, said tools being driven in the X, Y, Z directions and in said rotational direction, coupled with said detecting mechanism, to which said tools are coupled; and
   a mechanism for holding said detecting mechanism midway between said multi-spindle tool and a work piece, and for rotating said detecting mechanism in a plane perpendicular to the axes of said tools but about an axis different from those of said tools:
   said method comprising the steps of:
   a. driving said detecting mechanism in the Z-direction so as to bring said first detector to a given position on the surface of said work piece;
   b. detecting the position of a hole in said work piece with said first detector maintained in contact with the surface of said work piece, thereby bringing the position of said first detector into registration with the position of one hole;
   c. rotating said detecting mechanism in its entirety about said first detector to bring said second detector into registration with another hole in said work piece;
   d. rotating said detecting mechanism about an axis different from those of the tools, for removing said detecting mechanism from the space in which said multi-spindle tools are located in opposing relation to said work piece; and
   e. driving said multi-spindle tools in the Z-direction so as to insert screws held on said tools into holes in said work piece.

13. A method for controlling an apparatus for positioning control for multi-spindle tools, which apparatus includes:
   a detecting mechanism provided with first and second detectors corresponding to said first and second detecting points;
   a first drive mechanism for varying the relative position between said first detector and said first detecting point; and
   a second drive mechanism for rotating said detecting mechanism relative to said object about said first detecting position serving as a rotational center to thereby bring said second detector in register with said detecting point after said first drive mechanism has brought said first detector into registration with said first detecting point;

wherein each of said detectors includes detecting elements consisting of luminous elements and light detecting elements for detecting the light emitted from said luminous elements and reflected by said work piece; and wherein said first detector has a plurality of detecting elements arranged so as to surround a non-sensitive area having a size approximating that of a hole in said work piece corresponding to a detecting point thereon, said plurality of detecting elements being electrically insulated from each other;

said method comprising the steps of:
- a. rotating said detecting mechanism until an output is obtained from at least one detecting element of said first detector;
- b. bringing a first hole to be positioned into registration with the position of said non-sensitive area surrounded with a plurality of detecting elements of said first detector; and
- c. rotating said detecting mechanism, with said nonsensitive area in said first detector being maintained in registration with the position of said first hole, thereby bringing said second detector into registration with a second hole.

14. A method according to claim 1, wherein step (a) includes the step of
- a1. displacing said first detector to be in alignment with said one of said positioning identification characteristic points on said second work piece, and wherein step (b) includes the step of
- b1. positioning said first work piece in response to an output from said first detector.

15. A method of positioning a first work piece in a prescribed alignment with a second work piece, said second work piece containing a plurality of positioning identification characteristic points, comprising the steps of:
- a. aligning a first detector defined relative to a first predetermined location on said first work piece with one of said positioning identification characteristic points on said second work piece;
- b. aligning a second detector defined relative to a second predetermined location on said first work piece with another of said positioning identification characteristic points on said second work piece; and
- c. positioning said first work piece relative to said second work piece in response to the alignment of said first and second detectors such that said first and second predetermined locations on said first work piece correspond to said one of said positioning identification characteristic points and said another of said positioning identification characteristic points respectively.

16. A method according to claim 15, wherein step (c) includes the step of
- c1. displacing said first work piece in response to an output from said first and second detectors.

* * * * *

UNITED STATES PATENT OFFICE
CERTIFICATE OF CORRECTION

Patent No. 3,965,562            Dated June 29, 1976

Inventor(s) Tadao INOYAMA and Tatsuo GOTO

It is certified that error appears in the above-identified patent and that said Letters Patent are hereby corrected as shown below:

Title page as it reads now:

[75]     Inventor:     Tadao Inoyama, Yokohama, both of Japan

Title page as it should read:

[75]     Inventor:     Tatsuo Goto, Tokyo, and Tadao Inoyama, Yokohama, both of Japan

Signed and Sealed this

*Eighteenth* Day of *October 1977*

[SEAL]

*Attest:*

RUTH C. MASON          LUTRELLE F. PARKER
*Attesting Officer*      *Acting Commissioner of Patents and Trademarks*